(12) United States Patent
Chen

(10) Patent No.: US 9,442,875 B2
(45) Date of Patent: Sep. 13, 2016

(54) MULTI-PROTOCOL COMBINED RECEIVER FOR RECEIVING AND PROCESSING DATA OF MULTIPLE PROTOCOLS

(71) Applicant: Synaptics Incorporated, San Jose, CA (US)

(72) Inventor: Yonggang Chen, Johns Creek, GA (US)

(73) Assignee: Synaptics Incorporated, San Jose, CA (US)

(*) Notice: Subject to any disclaimer, the term of this patent is extended or adjusted under 35 U.S.C. 154(b) by 403 days.

(21) Appl. No.: 14/084,507

(22) Filed: Nov. 19, 2013

(65) Prior Publication Data

US 2015/0143006 A1    May 21, 2015

(51) Int. Cl.
| | | |
|---|---|---|
| G06F 13/00 | (2006.01) | |
| G06F 13/40 | (2006.01) | |
| G06F 13/42 | (2006.01) | |
| G06F 13/38 | (2006.01) | |

(52) U.S. Cl.
CPC ......... *G06F 13/4022* (2013.01); *G06F 13/385* (2013.01); *G06F 13/4086* (2013.01); *G06F 13/4282* (2013.01)

(58) Field of Classification Search
USPC .................. 710/104–110, 305–317, 260–269
See application file for complete search history.

(56) References Cited

U.S. PATENT DOCUMENTS

| | | | |
|---|---|---|---|
| 7,677,925 B2 | 3/2010 | Chuang | |
| 7,727,027 B2 | 6/2010 | Chiang et al. | |
| 8,019,906 B2 | 9/2011 | Lee et al. | |
| 8,122,160 B2 | 2/2012 | Lee et al. | |
| 8,380,887 B2 | 2/2013 | Lee et al. | |
| 2012/0025894 A1* | 2/2012 | Yang | H03K 19/018528 327/408 |
| 2012/0260301 A1 | 10/2012 | Wu et al. | |

* cited by examiner

*Primary Examiner* — Raymond Phan
(74) *Attorney, Agent, or Firm* — Osha Liang LLP

(57) ABSTRACT

A receiver circuit configured to operate in a DisplayPort (DP) mode and a High-Definition Multimedia Interface (HDMI) mode. The receiver circuit includes: termination circuitry configured to receive a DP signal in the DP mode and an HDMI signal in the HDMI mode; and voltage common-mode (VCM) level shifter circuitry configured to operate as a pass-through for the DP signal in the DP mode and generate a converted HDMI signal from the HDMI signal in the HDMI mode.

17 Claims, 6 Drawing Sheets

US 9,442,875 B2

MULTI-PROTOCOL COMBINED RECEIVER FOR RECEIVING AND PROCESSING DATA OF MULTIPLE PROTOCOLS

BACKGROUND

DisplayPort (DP) is a digital display interface primarily used to connect a video source to a display device such as a computer monitor, though it can also be used to transmit audio, USB, and other forms of data. High-Definition Multimedia Interface (HDMI) is a compact audio/video interface for transferring uncompressed video data and compressed/uncompressed digital audio data from a HDMI-compliant device ("the source device") to a compatible computer monitor, video projector, digital television, or digital audio device. As both the DP and the HDMI standards are ubiquitous, the need for chips and devices that are compatible with both the DP standard and the HDMI standard is increasing.

SUMMARY

In general, in one aspect, the invention relates to a receiver circuit configured to operate in a DisplayPort (DP) mode and a High-Definition Multimedia Interface (HDMI) mode. The receiver circuit comprises: termination circuitry configured to receive a DP signal in the DP mode and an HDMI signal in the HDMI mode; and voltage common-mode (VCM) level shifter circuitry configured to operate as a pass-through for the DP signal in the DP mode and generate a converted HDMI signal from the HDMI signal in the HDMI mode.

In general, in one aspect, the invention relates to a method of operating a receiver compatible with DisplayPort (DP) signals and High-Definition Multimedia Interface (HDMI) signals. The method comprises: obtaining a control signal identifying a type of input signal; connecting, by manipulating a first switch based on the control signal, a termination resistor of the receiver to a power supply required to receive the type of input signal; and placing, by manipulating a second switch based on the control signal, voltage common-mode (VCM) level shifter circuitry of the receiver in a mode corresponding to the type of input signal.

In general, in one aspect, the invention relates to a system. The system comprises: a source; a transmission line (TL) connected to the source; and a receiver configured to operate in a DisplayPort (DP) mode and a High-Definition Multimedia Interface (HDMI) mode, the receiver comprising: termination circuitry configured to receive a DP signal in the DP mode and an HDMI signal in the HDMI mode; voltage common-mode (VCM) level shifter circuitry configured to operate as a pass-through for the DP signal in the DP mode and generate a converted HDMI signal from the HDMI signal in the HDMI mode; and 1-V domain equalization circuitry comprising an adaptive equalizer, a clock and data recovery circuit, and a deserializer.

Other aspects of the invention will be apparent from the following description and the appended claims.

DETAILED DESCRIPTION

Figure 1:
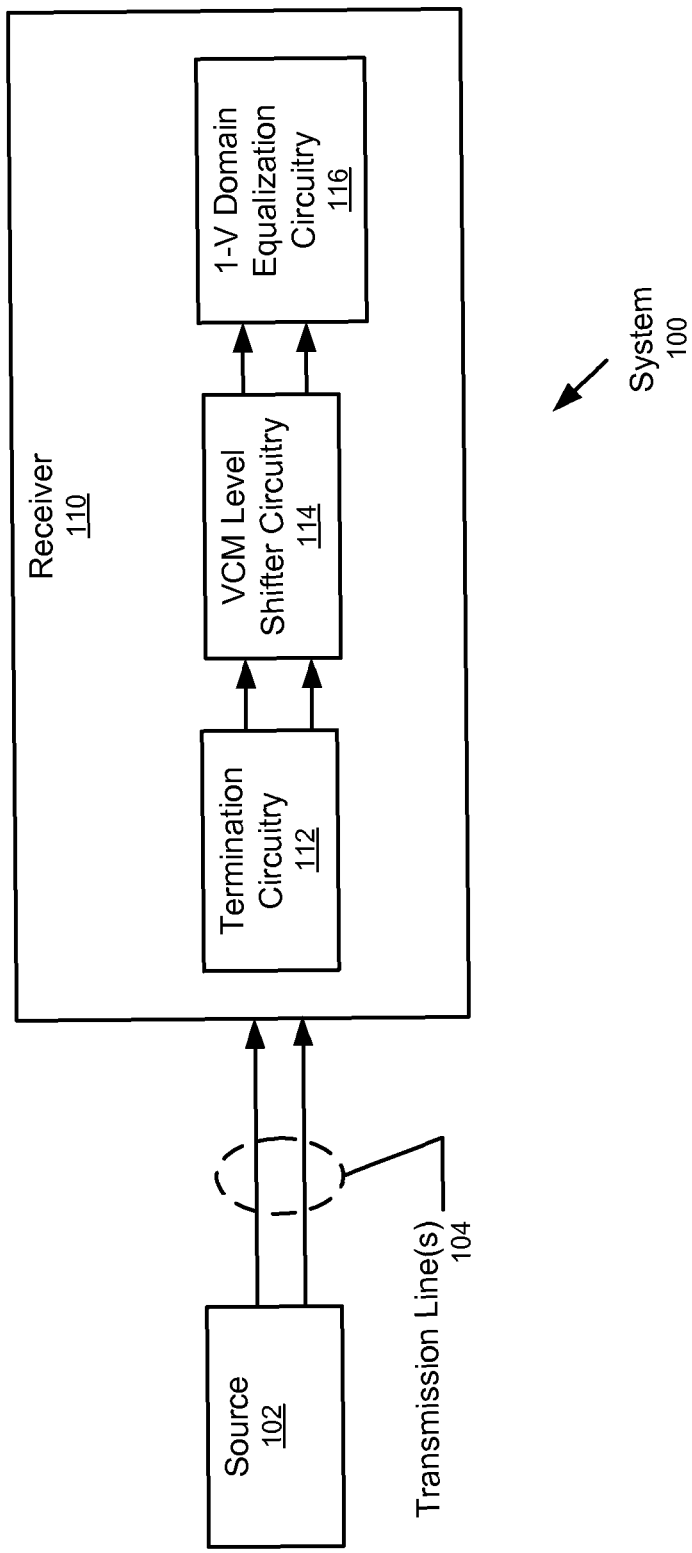
FIG. 1 shows a system with a receiver in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system (100) in accordance with one or more embodiments. As shown in FIG. 1, the system (100) includes a source (102) and a receiver (110) connected by one or more transmission lines (104). The receiver (110) is compatible with both the DP and the HDMI standards. In other words, the receiver (110) is capable of receiving and subsequently processing both DP signals and HDMI signals. Accordingly, the source (102) may correspond to either a DP source or an HDMI source.

In one or more embodiments, the receiver (110) has various types of circuitry including termination circuitry (112), voltage common-mode (VCM) level shifter circuitry (114), and 1-V domain equalization circuitry (116). The termination circuitry (112), the VCM level shifter circuitry (114), and the 1-V domain equalization circuitry (116) form at least part of a receiver circuit. Moreover, the receiver (110) is configured to operate in at least two modes: DP mode and HDMI mode. In DP mode, the termination circuitry (112) is configured to receive a DP signal, while the VCM level shifter circuitry (114) is configured to act as a pass-through (discussed below). In HDMI mode, the termination circuitry (112) is configured to receive an HDMI signal, while the VCM level shifter circuitry (114) is configured to generate a converted HDMI signal (discussed below) from the received HDMI signal. In both the DP mode and the HDMI mode, the 1-V domain equalization circuitry is configured to process the output of the VCM level shifter circuitry (114).

Although not shown in FIG. 1, the 1-V domain equalization circuitry (116) may include a variable gain amplifier, an adaptive equalizer, a clock and data recovery circuit, and a deserializer to process the output of the VCM level shifter circuitry (114). In one or more embodiments, the 1-V domain equalization circuitry (116) requires the output of the VCM level shifter circuitry (114) to have a pre-defined common-mode voltage level (e.g., ~0.7V) in order to correctly process the output of the VCM level shifter circuitry (114).

Although embodiments have focused primarily on HDMI signals and DP signals, those skilled in the art, having the benefit of this detailed description, will appreciate that the receiver (110) may be used with other similar protocols requiring termination circuitry (112) and VCM level shifter circuitry (114).

Figure 2:
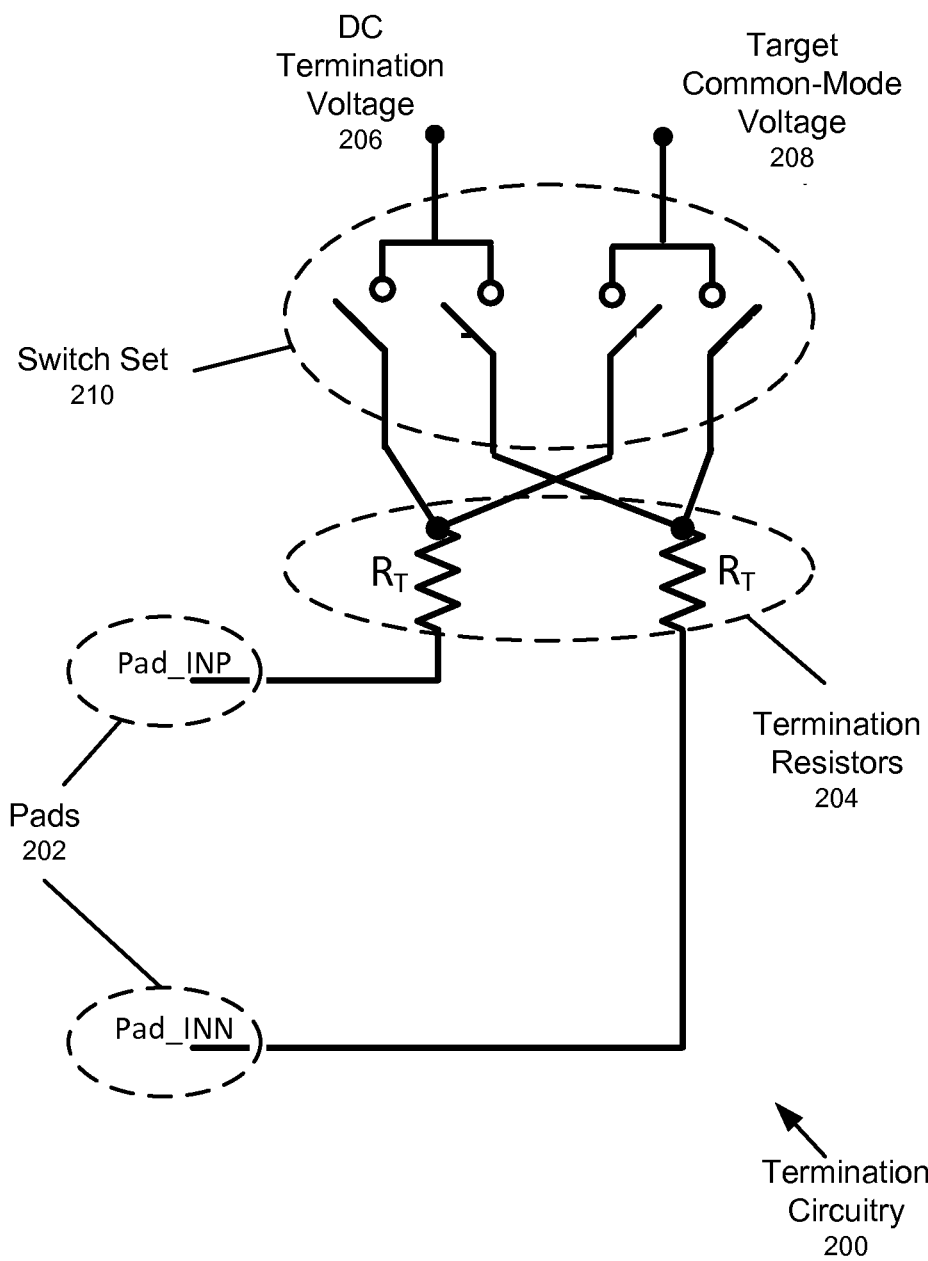
FIG. 2 shows termination circuitry of the receiver in accordance with one or more embodiments.

FIG. 2 shows termination circuitry (200) in accordance with one or more embodiments. The termination circuitry (200) may be an example of the termination circuitry (112), discussed above in reference to FIG. 1. The termination circuitry (200) is the first stage in the receiver (110) for the video signal path. As shown in FIG. 2, the termination circuitry (200) has multiple components including a set of pads (202), a set of termination resistors (204), a DC termination voltage (206), a target common-mode voltage (208), and a set of one or more switches (210).

In one or more embodiments, the set of pads (202) is configured to receive a DP video signal in the DP mode and receive an HDMI video signal in the HDMI mode (i.e., the termination circuitry (200) is compatible with both DP and HDMI). Moreover, as shown in FIG. 2, there exists a set of termination resistors (204) connected to the set of pads (202). Each termination resistor ($R_T$) may take on any value. For example, each termination resistor ($R_T$) in the set of termination resistors (204) may have a resistance of 50Ω (i.e., 100Ω differentially). In HDMI mode, the set of switches (210) connects the set of termination resistors (204) to the DC termination voltage (206). In DP mode, the set of switches (210) connects the set of termination resistors (204) to the target common-mode voltage (208). In other words, the positioning of the set of switches (210), and thus the connections formed by the set of switches (210), changes depending on the operating mode (i.e., DP mode, HDMI mode).

Those skilled in the art, having the benefit of this detailed description, will appreciate that DP signals are AC coupled. In DP mode, the set of termination resistors (204) is connected to the target common-mode voltage (208), which is the common-mode voltage level required by the 1-V domain equalization circuitry (116) (discuss above in reference to FIG. 1). Little or no DC current is needed from the target common-mode voltage (208) during operation.

Those skilled in the art, having the benefit of this detailed description, will appreciate that HDMI signals are DC coupled. In HDMI mode, the set of termination resistors (204) is connected to the DC termination voltage (206), which is the AVCC in the HDMI standard (i.e., ~3.3V). The common-mode voltage level is determined as AVCC minus half of the single ended signal amplitude. The DC termination voltage (206) should be able to supply up to 12 mA current to each termination resistor ($R_T$) in the set of termination resistors (204) (i.e., for the case of single end swing of 600 mV).

Figure 3:
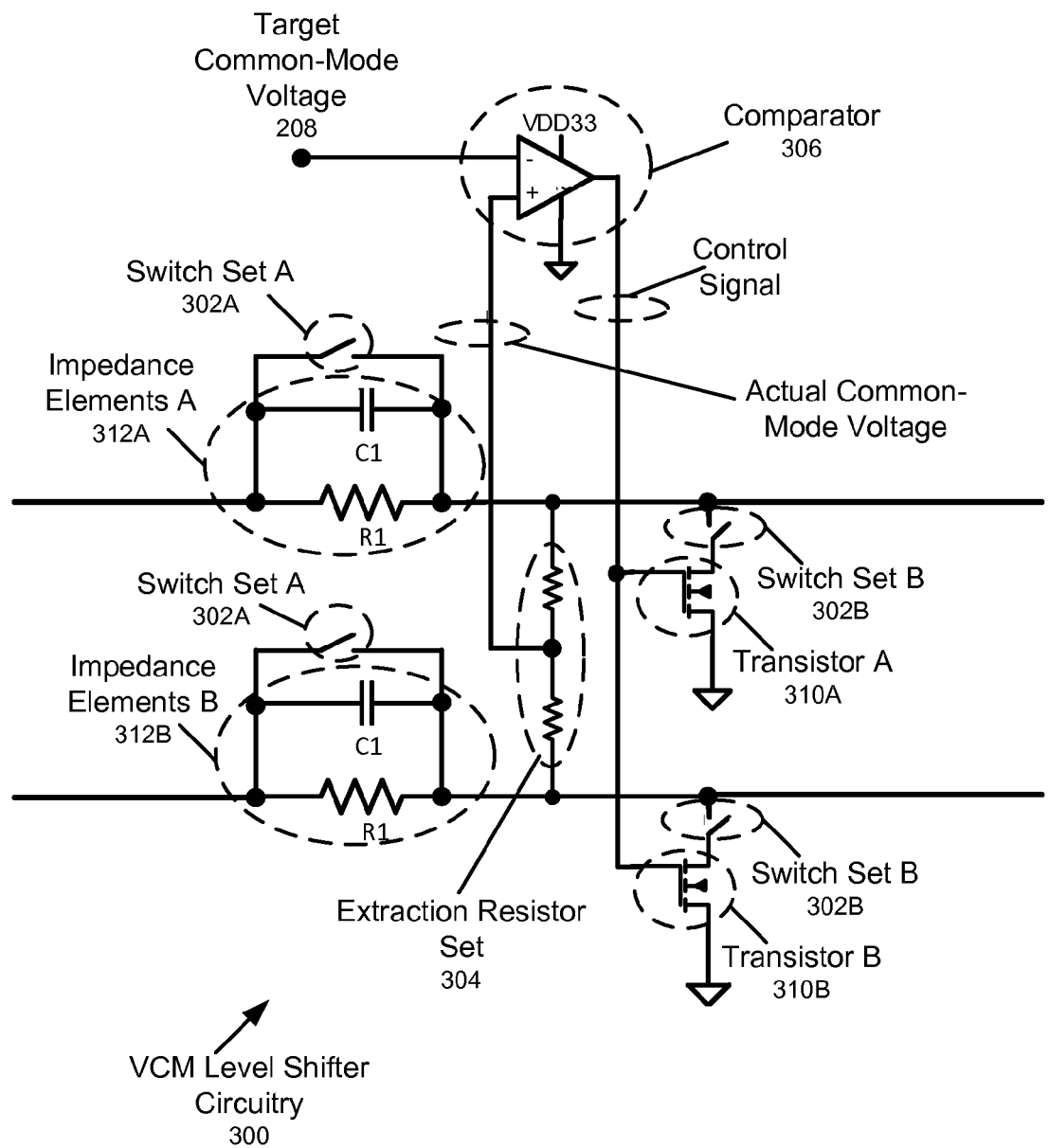
FIG. 3 shows VCM level shifter circuitry of the receiver in accordance with one or more embodiments.

FIG. 3 shows VCM level shifter circuitry (300) in accordance with one or more embodiments. The VCM level shifter circuitry (300) may be an example of the VCM level shifter circuitry (114), discussed above in reference to FIG. 1. The VCM level shifter circuitry (300) is the second stage in the receiver (110) for the video signal path. As shown in FIG. 3, the VCM level shifter circuitry (300) has multiple components including multiple transistors (e.g., transistor A (310A), transistor B (310B)), multiple impedance elements (IEs) (e.g., IE A (312A), IE B (312B)), a set of extraction resistors (304), a comparator (306), and multiple sets of switches (e.g., switch set A (302A), switch set B (302B).

In one or more embodiments, in DP mode, the switches in switch set A (302A) are closed while the switches in switch set B (302B) are open. In this configuration, switch set A (302A) shorts the IEs (312A, 312B), while switch set B (302B) disconnects the transistors (310A, 310B) from the output of the VCM level shifter circuitry (300). In other words, in DP mode, the VCM level shifter circuitry (300) is effectively a pass-through (i.e., a low loss path): the output of the VCM level shifter circuitry (300) is approximately equal to its input. In DP mode, there is no need to manipulate the input, as the common-mode voltage level of the input equals or approximately equals the pre-determined common-mode voltage level required by the 1-V domain equalization circuitry (116) (e.g., ~0.7V).

In one or more embodiments, in HDMI mode, the switches in switch set A (302A) are open while the switches in switch set B (302B) are closed. In this configuration, the VCM level shifter circuitry (300) down converts the input to the pre-determined common-mode voltage level required by the 1-V domain equalization circuitry (116). In other words, in HDMI mode, the VCM level shifter circuitry (300) generates/outputs a converted HDMI signal having the common-mode voltage level required by the 1-V domain equalization circuitry (116).

In one or more embodiments, the set of extraction resistors (304), the comparator (306), and the transistors (310A, 310B) form a feedback loop. Specifically, the extraction resistors (304) are configured to extract the actual common-mode voltage from the converted HDMI signal (i.e., the output of the VCM level shifter circuitry (300). Each extraction resistor ($R_E$) may be much larger than the termination resistors ($R_T$), discussed above in reference to FIG. 2. The comparator (306) then compares the target common-mode voltage (208) (i.e., the common-mode voltage level required by the 1-V domain equalization circuitry (116) with the actual common-mode voltage of the output, and generates a control signal based on the difference. The control signal controls the transistors (310A, 310B) to force the actual common-mode voltage of the output to match the target common-mode voltage (208). For example, the transistors (310A, 310B) may reduce the actual common-mode voltage in the output so that the actual common-mode voltage of the output equals the target common-mode voltage (208).

Although FIG. 3 shows the transistors (310A, 310B) as NMOS transistors and the comparator (306) as an operation amplifier (Op-Amp), those skilled in the art, having the benefit of this detailed description, will appreciate that other configurations are possible.

In one or more embodiments, each of the IEs (IE A (312A), IE B (312B)) includes a capacitor ($C_1$) in parallel with a resistor ($R_1$). Let Z be the impedance of the capacitor ($C_1$) in parallel with the resistor ($R_1$). The AC attenuation of the VCM level shifter circuitry (300) is a function of Z and the output impedance ($R_O$) of the transistors (310A, 310B). For a large $C_1$, the impedance Z at high frequency will be much lower than $R_O$. This indicates that VCM level shifter circuitry (300) will show a low loss at high frequencies, which is required in HDMI mode.

Figure 4:
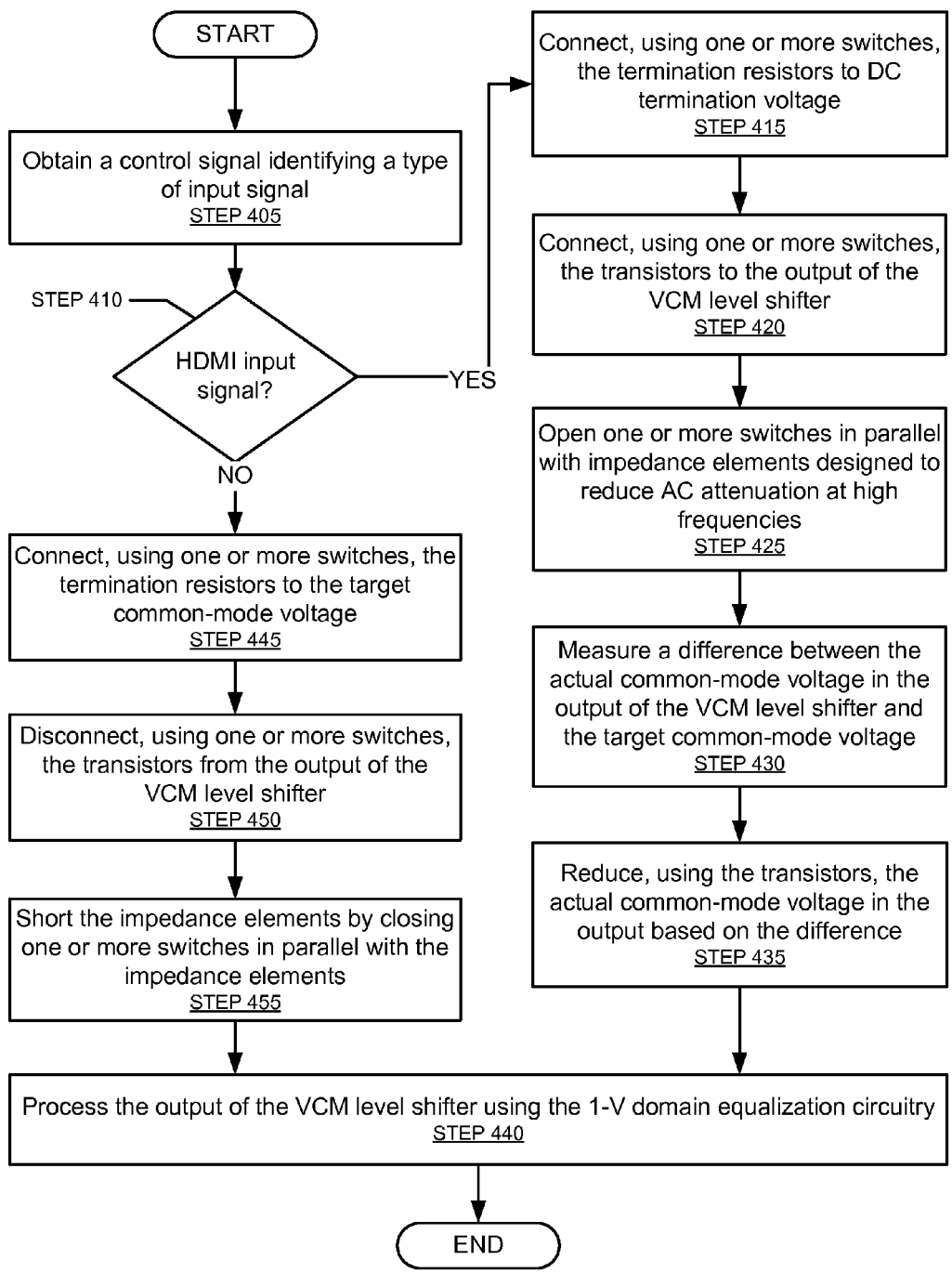
FIG. 4 shows a flowchart for operating the receiver in accordance with one or more embodiments.

FIG. 4 shows a flowchart in accordance with one or more embodiments. The process shown in FIG. 4 may involve, for example, one or more components/circuits discussed above in reference to FIG. 1, FIG. 2, and FIG. 3. One or more steps shown in FIG. 4 may be omitted, repeated, and/or performed in a different order among different embodiments of the invention. Accordingly, embodiments of the invention should not be considered limited to the specific number and arrangement of steps shown in FIG. 4.

Initially, a control signal is received (STEP 405). The control signal indicates/identifies the type of video signal being received (or that will be received) by a receiver. The video signal may correspond to an HDMI signal or to a DP signal. When it is determined, based on the control signal, that the video signal is an HDMI signal (STEP 410), the process proceeds to STEP 415. Otherwise, when it is determined that the video signal is a DP signal, the process proceeds to STEP 445.

In STEP 415, one or more switches in the termination circuitry of the receiver are positioned to connect the termination resistors to the DC termination voltage. As discussed above, the DC termination voltage is the AVCC in the HDMI standard (i.e., ~3.3V). The common-mode voltage level is determined as AVCC minus half of the single ended signal amplitude. The DC termination voltage (206) should be able to supply up to 12 mA current to each termination resistor ($R_T$).

In STEP 420, one or more switches in the VCM level shifter circuitry of the receiver are positioned to connect the transistors to the output of the VCM level shifter circuitry. As discussed above, the VCM level shifter circuitry includes a feedback loop including the transistors. By connecting the transistors to the output of the VCM level shifter circuitry, the feedback loop is now operational.

In STEP 425, one or more switches in the VCM level shifter circuitry of the receiver are opened to ensure the path through the VCM level shifter circuitry includes various impedance elements. When closed, these switches short the impedance elements. When the switches are opened, the impedance elements and the impedances of the transistors influence the AC attenuation of the VCM level shifter circuitry. The impedance elements are designed to reduce AC attenuation at high frequencies, in other words to provide a low attenuation path across the interested signal band.

In STEP 430, the HDMI signal is now being received by the receiver. The VCM level shifter circuitry is generating a converted HDMI signal based on the received HDMI signal. A difference is measured between the actual common-mode voltage in the output of the VCM level shifter circuitry and a target common-mode voltage. As discussed above, the target common-mode voltage is the common-mode voltage level required by the 1-V domain equalization circuitry of the receiver (e.g., ~0.7V). The difference may be measured by a comparator (e.g., an operational amplifier). The comparator outputs a control signal based on the difference.

In STEP 435, the feedback loop including the comparator and the transistors forces the actual common-mode voltage in the output to the target common-mode voltage. Specifically, the control signal output by the comparator is an input to the transistors, and the transistors modify (e.g., reduce) the actual common-mode voltage of the converted HDMI signal (i.e., the output of the VCM level shifter circuitry) based on the control signal. The modification continues until the actual common-mode voltage matches the target common-mode voltage level.

In STEP 445, the receiver needs to be placed in DP mode. One or more switches in the termination circuitry of the receiver are positioned to connect the termination resistors to the target common-mode voltage level. Little or no DC current is needed from the target common-mode voltage during operation.

In STEP 450, one or more switches in the VCM level shifter circuitry are opened to disconnect the transistors from the output of the VCM level shifter circuitry. In this configuration, the feedback loop is opened. In STEP 455, one or more switches in the VCM level shifter circuitry are closed to short the impedance elements. In this configuration, the VCM level shifter circuitry effectively becomes a pass-though (i.e., a low-loss path). In other words, the output of the VCM level shifter is approximately equal to the input of the VCM level shifter circuitry.

In STEP 440, the 1-V domain equalization circuitry processes the output of the VCM level shifter circuitry. In the HDMI mode, the converted HDMI signal (i.e., the output of the VCM level shifter circuitry) has a common-mode voltage level that equals or approximately equals the predetermined common-mode voltage level required by the 1-V domain equalization circuitry. In DP mode, the received DP signal has a common-mode voltage level that already equals or approximately equals the predetermined common-mode voltage level required by the 1-V domain equalization circuitry.

Figure 5:
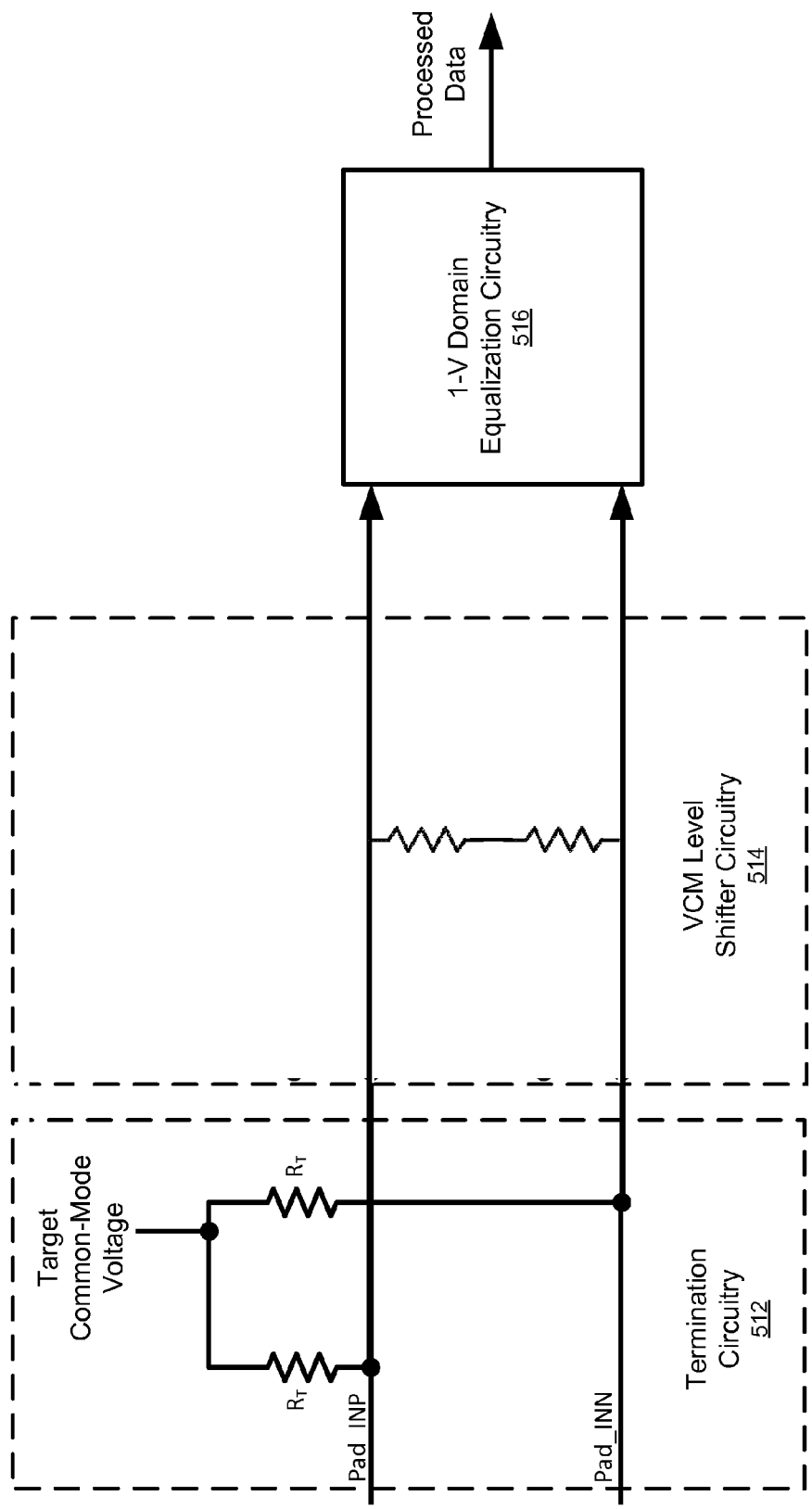
FIG. 5 shows the receiver in DP mode in accordance with one or more embodiments.

FIG. 5 shows the receiver in DP mode in accordance with one or more embodiments. In other words, FIG. 5 shows the electrical connections after all of the switches have been opened or closed to place the receiver in DP mode. As shown in FIG. 5, the receiver has termination circuitry (512), VCM level shifter circuitry (514), and 1-V domain equalization circuitry (516). Within the termination circuitry (512), the set of termination resistors is connected to the target common-mode voltage level. As also shown in FIG. 5, the VCM level shifter circuitry (514) is effectively a pass-through.

Figure 6:
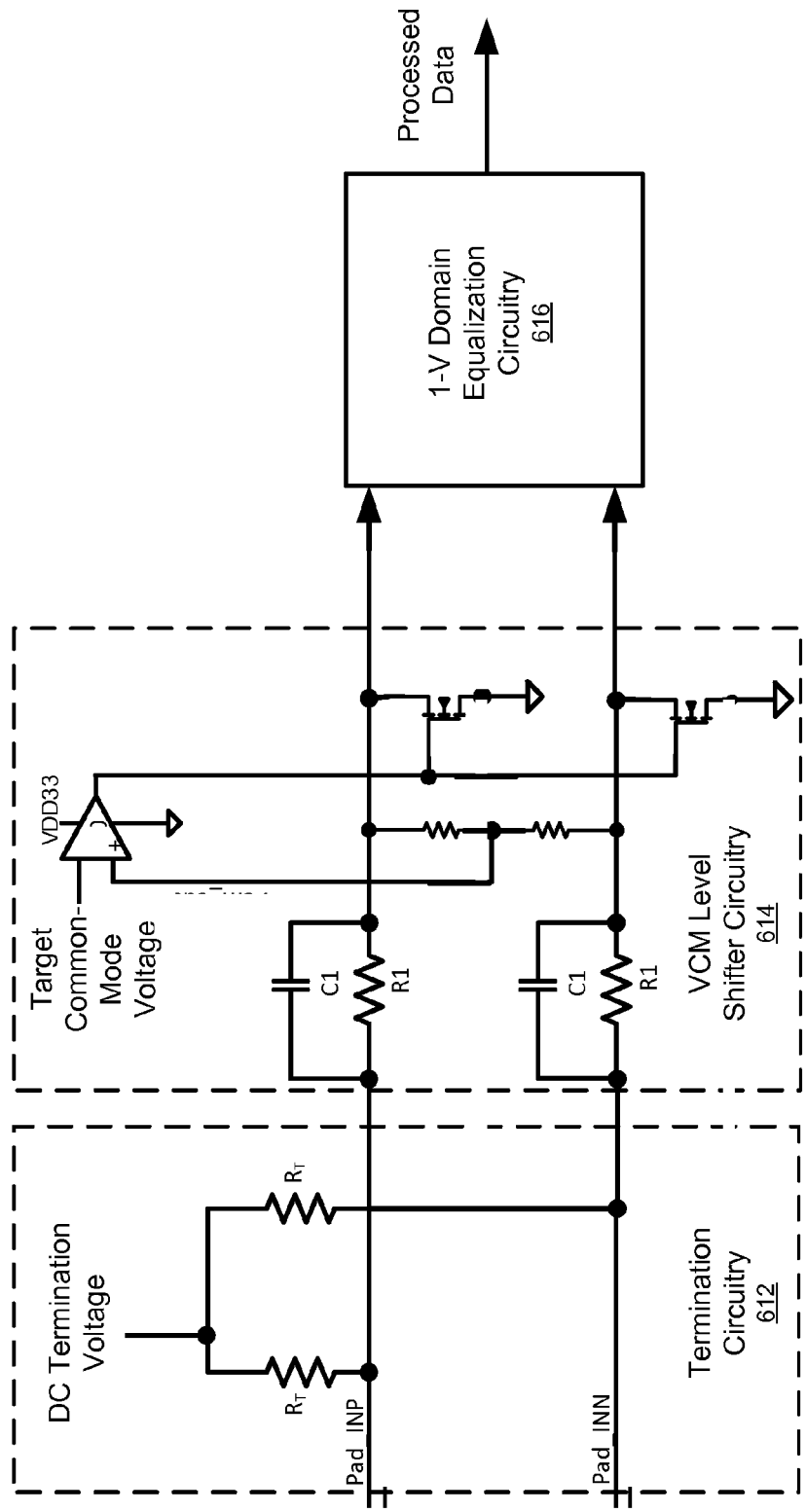
FIG. 6 shows the receiver in HDMI mode in accordance with one or more embodiments.

FIG. 6 shows the receiver in HDMI mode in accordance with one or more embodiments. In other words, FIG. 6 shows the electrical connections after all of the switches have been opened or closed to place the receiver in HDMI mode. As shown in FIG. 6, the receiver has termination circuitry (612), VCM level shifter circuitry (614), and 1-V domain equalization circuitry (616). Within the termination circuitry (612), the set of termination resistors is connected to the DC termination voltage. As also shown in FIG. 6, within the VCM level shifter circuitry (614), the feedback loop (i.e., comparator, transistors, etc.) is operational and C1 provides a low attenuation path for the AC signal across the interested frequency band.

Although embodiments have focused primarily on HDMI signals and DP signals, those skilled in the art, having the benefit of this detailed description, will appreciate that the receiver (110) may be used with other similar protocols requiring termination circuitry (112) and VCM level shifter circuitry (114).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A receiver circuit configured to operate in a DisplayPort (DP) mode and a High-Definition Multimedia Interface (HDMI) mode, comprising:
   termination circuitry configured to receive a DP signal in the DP mode and an HDMI signal in the HDMI mode, wherein the termination circuitry comprises:
      a plurality of pads for receiving the DP signal in the DP mode and the HDMI signal in the HDMI mode;
      a plurality of termination resistors connected to the plurality of pads;
      a DC termination voltage;
      a target common-mode voltage; and
      a first switch configured to:
         connect the plurality of termination resistors to the DC termination voltage in the HDMI mode; and
         connect the plurality of termination resistors to the target common-mode voltage in the DP mode; and
   voltage common-mode (VCM) level shifter circuitry configured to operate as a pass-through for the DP signal in the DP mode and generate a converted HDMI signal from the HDMI signal in the HDMI mode, wherein the VCM level shifter circuitry comprises:

a plurality of extraction resistors configured to extract an actual common-mode voltage from the converted HDMI signal;
a comparator configured to generate a control signal based on a difference between the target common-mode voltage and the actual common-mode voltage;
a plurality of transistors configured to reduce the actual common-mode voltage in the converted HDMI signal based on the control signal; and
a second plurality of switches configured to:
connect, during the HDMI mode, the plurality of transistors to an output of the VCM level shifter circuitry; and
disconnect, during the DP mode, the plurality of transistor from the output.

2. The receiver circuit of claim 1, wherein the DC termination voltage is 3.3V, wherein the target common-mode voltage is approximately 0.7V, and wherein each of the plurality of termination resistors has a resistance of 50 Ω.

3. The receiver circuit of claim 1, wherein at least one of the plurality of transistors is an NMOS transistor, and wherein the comparator is an operational amplifier.

4. The receiver circuit of claim 1, wherein the VCM level shifter circuitry further comprises:
a plurality of impedance elements operatively connected to the plurality of extraction resistors and configured to reduce, in HDMI mode, an alternating current (AC) attenuation of the VCM level shifter circuitry across the interested frequency band; and
a third plurality of switches configured to short the plurality of impedance elements in DP mode.

5. The receiver circuit of claim 4, wherein the plurality of impedance elements comprises a resistor in parallel with a capacitor.

6. The receiver circuit of claim 4, further comprising:
domain equalization circuitry configured to process the DP signal in the DP mode and process the converted HDMI signal in the HDMI mode, and comprising:
an adaptive equalizer;
a clock and data recovery circuit; and
a deserializer.

7. A method of operating a receiver compatible with DisplayPort (DP) signals and High-Definition Multimedia Interface (HDMI) signals, comprising:
obtaining a first control signal identifying a first type of input signal;
connecting, by manipulating a first termination circuitry switch based on the first control signal, a first termination resistor of the receiver to a first power supply required to receive the first type of input signal; and
placing, by manipulating a first voltage common-mode (VCM) circuitry switch based on the control signal, VCM level shifter circuitry of the receiver in a first mode corresponding to the first type of input signal, wherein placing the VCM level shifter circuitry in the first mode comprises:
connecting, using the first VCM circuitry switch, a transistor of a plurality of transistors in the VCM level shifter circuitry to the output signal, wherein the first type of the input signal is HDMI; and
opening a second VCM circuitry switch in parallel with a plurality of impedance elements configured to reduce an alternating current (AC) attenuation of the VCM level shifter circuitry across the interested frequencies.

8. The method of claim 7, further comprising:
measuring an actual common-mode voltage from the output signal using a plurality of extraction resistors;
generating, using a comparator, a difference between a target common-mode voltage and the actual common-mode voltage; and
reducing, using the plurality of transistors, the actual common-mode voltage in the output signal based on the difference.

9. The method of claim 7, further comprising:
obtaining a second control signal identifying a second type of input signal;
connecting, by manipulating a second termination circuitry switch based on the second control signal, a second termination resistor of the receiver to a second power supply required to receive the second type of input signal; and
placing, by manipulating the first VCM circuitry switch based on the second control signal, the VCM level shifter circuitry of the receiver in a second mode corresponding to the second type of input signal, wherein placing the VCM level shifter circuitry in the second mode comprises:
disconnecting, using the first VCM circuitry switch, the transistor of the plurality of transistors in the VCM level shifter circuitry from the output signal, wherein the second type of the input signal is DP; and
shorting, by closing the second VCM circuit switch, the plurality of impedance elements.

10. The method of claim 8, further comprising:
processing, by domain equalization circuitry of the receiver, the output signal.

11. A system, comprising:
a source;
a transmission line (TL) connected to the source; and
a receiver configured to operate in a DisplayPort (DP) mode and a High-Definition Multimedia Interface (HDMI) mode, the receiver comprising:
termination circuitry configured to receive a DP signal from the TL in the DP mode and an HDMI signal from the TL in the HDMI mode;
voltage common-mode (VCM) level shifter circuitry configured to operate as a pass-through for the DP signal in the DP mode and generate a converted HDMI signal from the HDMI signal in the HDMI mode; and
domain equalization circuitry comprising an adaptive equalizer, a clock and data recovery circuit, and a deserializer.

12. The system of claim 11, wherein the source is configured to generate the DP signal.

13. The system of claim 11, wherein the source is configured to generate the HDMI signal.

14. The system of claim 11, wherein the termination circuitry comprises:
a plurality of pads for receiving the DP signal in the DP mode and the HDMI signal in the HDMI mode;
a plurality of termination resistors connected to the plurality of pads;
a DC termination voltage;
a target common-mode voltage; and
a first switch configured to:
connect the plurality of termination resistors to the DC termination voltage in the HDMI mode; and
connect the plurality of termination resistors to the target common-mode voltage in the DP mode.

15. The system circuit of claim 14, wherein the DC termination voltage is 3.3V, wherein the common-mode voltage is approximately 0.7V, and wherein each of the plurality of termination resistors has a resistance of 50 Ω.

16. The system of claim 14, wherein the VCM level shifter circuitry comprises:
- a plurality of extraction resistors configured to extract an actual common-mode voltage from the converted HDMI signal;
- a comparator configured to measure a difference between the target common-mode voltage and the actual common-mode voltage;
- a plurality of transistors configured to reduce the actual common-mode voltage in the converted HDMI signal based on the difference; and
- a second plurality of switches configured to:
  - connect, during the HDMI mode, the plurality of transistors to an output of the VCM level shifter circuitry; and
  - disconnect, during the DP mode, the plurality of transistor from the output.

17. The system of claim 16, wherein the VCM level shifter circuitry further comprises:
- a plurality of impedance elements operatively connected to the plurality of extraction resistors and configured to reduce, in HDMI mode, an alternating current (AC) attenuation of the VCM level shifter circuitry at high frequencies; and
- a third plurality of switches configured to short the plurality of impedance elements in DP mode.

* * * * *